US012730955B2

(12) United States Patent
Balasubramanian et al.

(10) Patent No.: US 12,730,955 B2
(45) Date of Patent: Sep. 8, 2026

(54) "WEAK" UNDRIVEN STATE MODELLING FOR POWER MANAGEMENT VERIFICATION

(71) Applicant: TEXAS INSTRUMENTS INCORPORATED, Dallas, TX (US)

(72) Inventors: Lakshmanan Balasubramanian, Bengaluru (IN); Venkatraman Ramakrishnan, Bengaluru (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 1045 days.

(21) Appl. No.: 17/899,252

(22) Filed: Aug. 30, 2022

(65) Prior Publication Data

US 2024/0078369 A1 Mar. 7, 2024

(51) Int. Cl.

| | |
|---|---|
| ***G06F 30/367*** | (2020.01) |
| ***H03K 19/0948*** | (2006.01) |
| ***H03K 19/20*** | (2006.01) |
| *G06F 119/06* | (2020.01) |

(52) U.S. Cl.

CPC ....... *G06F 30/367* (2020.01); *H03K 19/0948* (2013.01); *H03K 19/20* (2013.01); *G06F 2119/06* (2020.01)

(58) Field of Classification Search

CPC ............... G06F 30/367; G06F 2119/06; H03K 19/0948; H03K 19/20

See application file for complete search history.

(56) References Cited

U.S. PATENT DOCUMENTS

| | | | | |
|---|---|---|---|---|
| 6,560,757 | B1 * | 5/2003 | Ballam | G06F 30/367 703/2 |
| 7,672,827 | B1 * | 3/2010 | Schapira | G06F 30/367 703/14 |
| 2004/0143800 | A1 * | 7/2004 | Posat | G06F 30/367 703/2 |

OTHER PUBLICATIONS

W. Sherwood, "A Mos Modelling Technique for 4-State True-Value Hierarchical Logic Simulation or Karnough Knowledge" pp. 775-785, 1981 IEEE. (Year: 1981).*

* cited by examiner

*Primary Examiner* — Kibrom K Gebresilassie

(74) *Attorney, Agent, or Firm* — Michelle F. Murray; Frank D. Cimino

(57) ABSTRACT

A "weak" undriven state is defined as a signal state, distinguished from conventional unknown and high impedance states, and methods of representing this "weak" undriven state in circuit modelling and power aware digital/mixed-signal simulations for comprehensive and complete RTL-level design verification. The conventional unknown state refers to a circuit element that is powered but has an unknown value, a circuit element that is not powered, or a circuit element having an undriven, floating signal. The unknown state is modified, and the "weak" undriven state refers to a circuit element that is not powered and has an unknown value. The "weak" undriven state can have an electrically high impedance to known supply or ground when no other circuit element is active. The "weak" undriven state distinction is particularly useful to model and verify circuit designs known to be resilient to "weak" undriven states, using event driven logic circuit simulators.

20 Claims, 6 Drawing Sheets

"WEAK" UNDRIVEN STATE MODELLING FOR POWER MANAGEMENT VERIFICATION

BACKGROUND

Conventional circuit simulators (e.g., event driven circuit simulators) do not differentiate between a circuit element that is powered-up, but is driving an unknown output value, and a circuit element that is not powered-up, and hence is weak. Both aspects are represented conventionally by one common "unknown" state identification. An unknown output value (e.g., X in Verilog HDL and VHDL) from a powered-up circuit element can be a statistical 0 or 1 state, or any other sustained, stable state (at mid-rail voltage level). A logical model based on conventional Boolean logic abstraction fully represents the aforementioned electrical behavior.

However, an unknown output value due to a power-off condition (e.g., where the supply voltage (and supply to ground potential difference) is less than the valid minimum level, $V_{min}$, for sustained logic operation, and remains less than $V_{min}$ over the logic operation), is not determinable due to the undriven nature. A conventional logical model cannot represent such an electrical behavior with the conventional abstraction:

Resistor pull-down (PD) on a net with X—results in X (equivalent to a logical wired OR)

Resistor pull-up (PU) on a net with X—results in X (equivalent to a logical wired AND)

This problem manifests as a limitation in verification of complex power management scenarios where the impact of a powered-down circuit has to be modelled in special circuitry in its fanout cone. This problem also manifests itself in power managed integrated circuits, where powered-off components exist. Internal pull-down or similar tolerable circuit behaviors cannot be modelled with Boolean logic behavior.

SUMMARY

The subject matter described herein defines verification strategies directed to a weak undriven state that provides a solution to verify designs, avoiding false failures in digital event driven simulations which otherwise would be seen with a conventional (strong, powered-up) unknown state. The disclosed embodiments provide comprehensive coverage with power-aware logic simulation even at an early design stage (register transfer level (RTL)), avoiding a need for post-implementation electrical circuit (e.g., SPICE) simulation of digital circuits as the only means to represent the electrical behaviors associated with the weak undriven state. Using methods of the described examples avoids sensitivity to implementation of RTL, as RTL verification can be comprehensive (both for all Boolean and the aforementioned electrical behavior). Further, no specific additional checks are needed post implementation.

The disclosed embodiments introduce and define a "weak" undriven state as a signal state, distinguished from a conventional unknown state (i.e., where a circuit element is powered but has an unknown output value, a circuit element is undriven left floating, or a circuit element that is not powered), that combines both undriven and "strong" or "weak" unknown states, with unique properties of representing this "weak" undriven state in circuit modelling and digital/mixed-signal simulations for comprehensive and complete RTL-level design verification. This distinction is particularly useful to model and verify designs of circuits known to be resilient to "weak" undriven states, using event driven logic circuit simulators, avoiding the need for electrical (SPICE) simulators in simulation of digital circuits solely for the purposes of discerning the electrical behaviors associated with the weak undriven state.

Accordingly, the described examples use the new, "weak" undriven state, attached to existing logic datatypes, to enable digital event driven circuit simulators to verify designs that include circuits having "weak" undriven states. In view thereof, the disclosed embodiments are applicable for digital simulations, to establish completeness of digitally focused event-driven simulations.

In one aspect, the conventional unknown state is modified to refer to a circuit element that is powered but has an unknown output value, or a circuit element that is undriven left floating. The "weak" undriven state refers to a circuit element that is not powered and has an unknown output value. In certain aspects, the "weak" undriven state has an electrically high impedance either to known supply or ground, but not to both supply and ground, when no other circuit element is active. High impedance refers to an output signal state in which the signal is not being driven. In certain other aspects, the "weak" undriven state has an electrically high impedance to known supply and a relatively low impedance to known ground, or vice-versa. It is important to note that there is a conventional notion of a high impedance state (e.g., Z in Verilog HDL and VHDL) which represents an electrical high impedance to both supply and ground.

In accordance with one example, a method of simulating operation of a circuit comprising a plurality of Complementary Metal Oxide Semiconductor (CMOS) logic style circuit elements includes defining an unknown (either strong or weak) state, where a circuit element is powered but has an unknown output value, or where a circuit element is undriven left floating; defining a weak undriven state, distinguishable from the unknown (both strong and weak) state, where a circuit element is not powered and hence has an unknown output value; and performing a digital circuit simulation. The digital circuit simulation can apply characteristics of a truth table defined for the weak undriven state and of a conventional logic truth table updated for the weak undriven state.

In accordance with another example, a non-transitory computer-readable medium storing instructions that, when executed by a processor, cause the processor to define an unknown state, where a circuit element is powered but has an unknown output value, or where a circuit element is undriven left floating; define a weak undriven state, distinguishable from the unknown (X) and high impedance (Z) states, where a circuit element is not powered and has an unknown output value; and perform a digital circuit simulation. The digital circuit simulation can apply characteristics of a truth table defined for the weak undriven state and of a conventional logic truth table updated for the weak undriven state.

In accordance with still another example, a digital circuit verification system includes a hardware processing unit; and a non-transitory computer-readable storage medium storing instructions that, when executed by the hardware processing unit, cause the digital circuit verification system to define an unknown state, where a circuit element is powered but has an unknown output value, or where a circuit element is undriven left floating; define a weak undriven state, distinguishable from the unknown and high impedance states, where a circuit element is not powered and has an unknown output value; and perform a digital circuit simulation. Again, the digital circuit simulation can apply characteristics of a truth table defined for the weak undriven state and of a conventional logic truth table updated for the weak undriven state.

BRIEF DESCRIPTION OF THE DRAWINGS

For a detailed description of various examples, reference will now be made to the accompanying drawings in which.

DETAILED DESCRIPTION

Figure 1A:
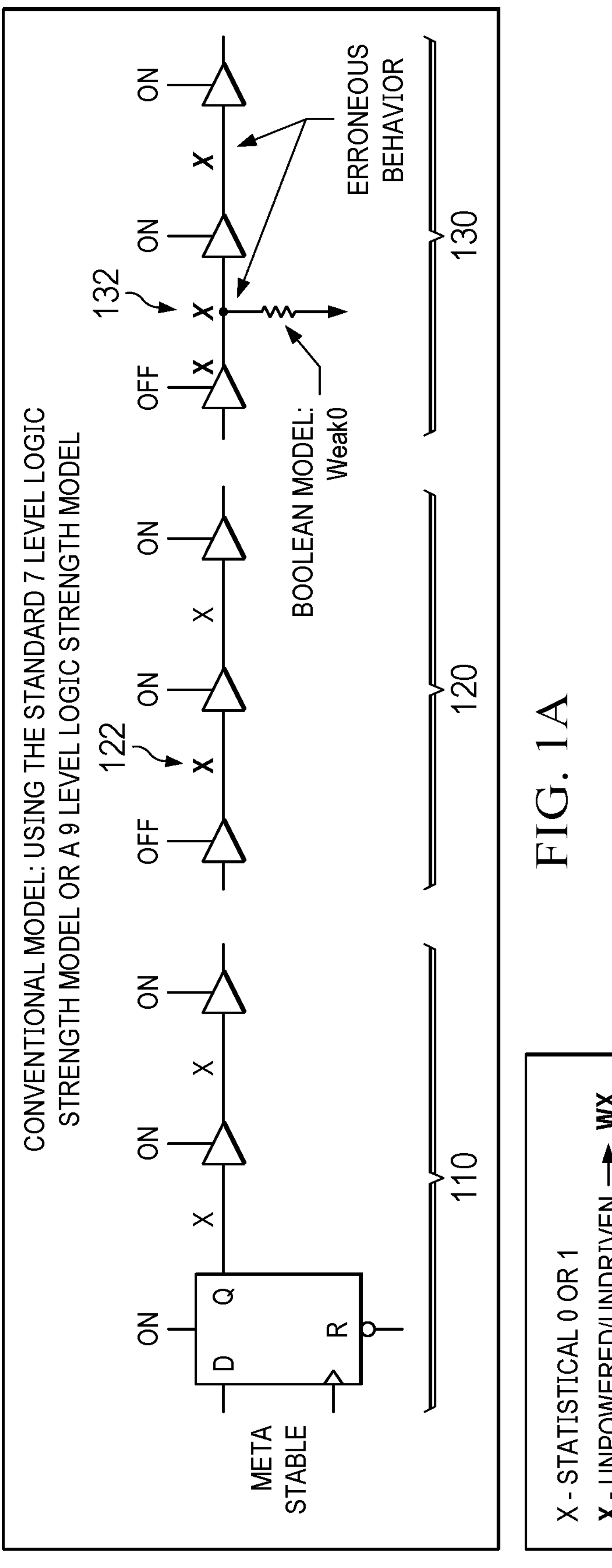
FIG. 1A illustrates certain known conventional model behaviors, and associated limitations, where the conventional model uses a standard seven (7) level logic strength model of Verilog HDL or a nine (9) level logic strength model of VHDL.

Specific aspects and examples will now be described in detail with reference to the accompanying figures. Like elements in the various figures are denoted by like reference numerals for consistency. In the following detailed description, numerous specific details are set forth in order to provide a more thorough understanding. However, it will be apparent to one of ordinary skill in the art that the certain described aspects may be practiced without these specific details. In other instances, well-known features have not been described in detail to avoid unnecessarily complicating the description.

Certain terms are used throughout the following description and claims to refer to particular system components. As one skilled in the art will appreciate, different parties may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct wired or wireless connection. Thus, if a first device couples to a second device, that connection may be through a direct connection or through an indirect connection via other devices and connections. The recitation "based on" is intended to mean "based at least in part on." Therefore, if X is based on Y, X may be a function of Y and any number of other factors.

Conventional circuit simulators do not differentiate between a circuit element that is powered-up while driving an unknown output value; a circuit element that is not driven and is, thus, left floating; and a circuit element that is not powered-up, and hence is weak; because all are represented by the conventional unknown state. An unknown output value from a powered-up circuit element can be a statistical 0 or 1 state, or any other sustained, stable state (at mid-rail voltage level). A logical model fully represents the aforementioned electrical behavior. A statistical 0 or 1 state means the state can be either 0 or 1, with a finite, complementary probability (that is mutually exclusive) that each state may be influenced by random events including circuit and environmental noise, temperature, coupling to unrelated signals, etc.

However, an unknown output value due to a power-off condition (e.g., where the supply voltage (and supply to ground potential difference) is less than the valid minimum level, $V_{min}$, for sustained logic operation, and remains less than $V_{min}$ over the logic operation) is not determinable due to the undriven nature. A conventional logical model cannot differentiate between a circuit element that is powered-up, but is driving an unknown output value, and a circuit element having an unknown output value due to a power-off condition.

The following conventional abstraction simply cannot distinguish the above-identified electrical behaviors. For example, a resistor pull-down (PD) in a circuit, that is, a resistor connected between an output of a circuit element and a related ground node, where the output value of the circuit element prior to the resistor is represented with an X, results in a X value at the resistor (thereby being equivalent to a logical wired OR). Further, a resistor pull-up (PU) in a circuit, that is, a resistor connected between an output of a circuit element and a related supply node, where an output value of the circuit element prior to the resistor is represented with an X, results in a X value at the resistor (thereby being equivalent to a logical wired AND). Simplifying the above examples, provides the following expressions:

Resistor pull-down (PD) on a net with X–results in X (equivalent to a logical wired OR)

Resistor pull-up (PU) on a net with X–results in X (equivalent to a logical wired AND)

There are no known direct logic simulation solutions to this problem. A distinction is necessary to validate the correctness of certain circuits that function differently with a weak driver than with a driver that is powered-up and strong.

The disclosed embodiments define a "weak" undriven state as a signal state, distinguished from a conventional unknown state, and provides methods of discerning this "weak" undriven state in circuit modelling and digital/mixed-signal simulations for comprehensive and complete RTL-level design verification. The conventional unknown state refers to a circuit element that is powered but has an unknown output value, a circuit element that is undriven and left floating, or a circuit element that is not powered. In the described examples, the unknown state is modified to refer only to a circuit element that is powered but has an unknown output value, or a circuit element that is undriven left floating. The "weak" undriven state refers to a circuit element that is not powered and has an unknown output value. In certain aspects, the "weak" undriven state has an electrically high impedance to known supply or ground when no other circuit element is active.

The "weak" undriven state distinction is particularly useful to model and verify circuit designs known to be resilient to "weak" undriven states, using event driven logic circuit simulators, avoiding the need for electrical (SPICE) simulators in simulation of digital circuits solely for the purposes of representing the electrical behaviors associated with weak undriven state. The new, "weak" undriven state enables digital circuit simulators to verify designs that include circuits having "weak" undriven states. Accordingly, the disclosed embodiments are applicable for digital simulations, to establish completeness of digitally focused event-driven simulations.

An output signal of an unknown value in circuit verification is conventionally represented by the symbol "X", with this symbol being understood in regular Boolean logic evaluation as follows:

Logical (Strong & Weak):

0 AND X=0; 1 AND X=X; 0 OR X=X; 1 OR X=1;

Logical (Other):

Z AND X=X; X AND X=X; Z OR X=X; X OR X=X; NOT X=X; and

Multiple Driver Resolution (for 2 Drivers):

0.0=0; 1.1=1; 0.1=X; Weak0.Weak1=X; Weak0.1=1; 0.Weak1=0; X.X=X; 0.X=Weak0.X=X; 1.X=Weak1.X=X; Z.Z=Z; 0.Z=0; 1.Z=1; X.Z=X; Weak0.Z=Weak0; Weak1.Z=Weak1; Weak1.Weak1=Either Weak1 or 1 (Implementation and drive strength specific); Weak0.Weak0=Either Weak0 or 0 (Implementation and drive strength specific).

As an example, and explanation, of the above, for circuit elements that are powered-up (for both strong and weak drive strengths): a circuit element having inputs of 0 and X, with logical gate operation AND, will result in an output state of 0. A circuit element having inputs of 1 and X, with logical gate operation AND, will result in an output state of X. A circuit element having inputs of 0 and X, with logical gate operation OR, will result in an output state of X. A circuit element having inputs of 1 and X, with logical gate operation OR, will result in an output state of 1. Note that in this Logical (strong and weak) example, weak does not mean the driving circuit element is powered-off. The circuit element is powered-on, but has a weak drive strength.

For other scenarios (e.g., where the output signal is an unknown or has a high impedance state), a circuit element having inputs of Z and X, with logical gate operation AND, will result in an output state of X. A circuit element having inputs of X and X, with logical gate operation AND, will result in an output state of X. A circuit element having inputs of Z and X, with logical gate operation OR, will result in an output state of X. A circuit element having an input X, with logical gate operation NOT, will result in an output state of X.

Multiple driver resolution describes a situation where two (2) circuit elements are in parallel (i.e., a common node is driven by the outputs of both circuit elements as drivers), where, for example, the second circuit element includes a resistor, and determination of an effective resultant output is to be made. Therefore, resolution here indicates the effective resultant logic state on the net connected to an output of more than one logic circuit. For notation purposes, a dot "." is used to indicate this operation. The above is described for two (2) drivers. However, it is understood that the articulated results are scalable for three (3) or more drivers (i.e., for n drivers).

For the multiple driver resolution (i.e., two (2) circuit elements), above, the first example describes a scenario where the first circuit element has an output value 0, the second circuit element has an output value 0. Here, the effective resultant output value is 0. In the second example, the first circuit element has an output value 1, the second circuit element has an output value 1, and the effective resultant output value is 1. In the third example, the first circuit element has an output value 0, the second circuit element has an output value 1, and the effective resultant output value is X. In the fourth example, the first circuit element has an output value 0 with weak drive strength, the second circuit element has an output value 1 with weak drive strength, and the effective resultant output value is X. In the fifth example, the first circuit element has an output value 0 with weak drive strength, the second circuit element has an output value 1, and the effective resultant output value is 1. In the sixth example, the first circuit element has an output value 0, the second circuit element has an output value 1 with weak drive strength, and the effective resultant output value is 0. In the seventh example, the first circuit element has an output value X, the second circuit element has an output value X, and the effective resultant output value is X. In the eighth example, if the first circuit element has an output value 0, and the second circuit element has an output value X, or if the first circuit element has an output value 0 with weak drive strength, and the second circuit element has an output value X, the effective resultant output value is X. In the ninth example, if the first circuit element has an output value 1, and the second circuit element has an output value X, or if the first circuit element has an output value 1 with weak drive strength, and the second circuit element has an output value X, the effective resultant output value is X. In the tenth example, the first circuit element has an output value Z, the second circuit element has an output value Z, and the effective resultant output value is Z. In the eleventh example, the first circuit element has an output value 0, the second circuit element has an output value Z, and the effective resultant output value is 0. In the twelfth example, the first circuit element has an output value 1, the second circuit element has an output value Z, and the effective resultant output value is 1. In the thirteenth example, the first circuit element has an output value X, the second circuit element has an output value Z, and the effective resultant output value is X. In the fourteenth example, the first circuit element has an output value 0 with weak drive strength, the second circuit element has an output value Z, and the effective resultant output value is a 0 with weak drive strength. In the fifteenth example, the first circuit element has an output value 1 with weak drive strength, the second circuit element has an output value Z, and the effective resultant output value is a 1 with weak drive strength. In the sixteenth example, the first circuit element has an output value 1 with weak drive strength, the second circuit element has an output value 1 with weak drive strength, and the effective resultant output value is either a 1 with weak drive strength, or a 1, depending on implementation and drive strength specifics. Lastly, in the seventeenth example, the first circuit element has an output value 0 with weak drive strength, the second circuit element has an output value 0 with weak drive strength, and the effective resultant output value is either a 0 with weak drive strength, or a 0, depending on implementation and drive strength specifics.

FIG. 1A illustrates certain conventional model 100 behaviors, and associated limitations. FIG. 1A shows a conventional model 100 using the standard seven (7) or nine (9) level logic strength model of hardware description language (Verilog HDL or VHDL respectively). In digital circuits, a logic level is one of a finite number of states that a digital signal can inhabit. Logic levels are represented by the voltage difference between the signal and ground. For example, nine (9) level logic is defined by IEEE 1164 for use in electronic design automation, and includes strong and weakly driven signals, high impedance, unknown, uninitialized and don't care states. The seven (7) level logic is a subset of the nine (9) level logic, with uninitialized (u) and don't care (-) states represented by unknown (x).

As shown in FIG. 1A, at 110, any sequential element like a flip-flop or latch that is operating in a metastable state can result in an unknown state which can be either a logical 0 or 1, determined statistically based on the circuit and environmental conditions. Conventionally this is represented as an unknown 'X'. At 110, each triangular circuit element is a logic buffer that transfers the state at the input to the output if the buffer is powered ON. At 110, each buffer is noted as ON; meaning, the power supply is on (i.e., consistently above a certain $V_{min}$), and the circuit is operating normally.

However, as shown in FIG. 1A, at 120, with the emergence of low power design techniques, a powered-off circuit element can result in an unknown signal level at its output which is also represented as 'X' conventionally (at the powered-off circuit element output value, 122, the representative 'X' is a different, unpowered, undriven, unknown). At 122, the representative 'X' cannot be determined to be a statistical 0 or 1, because power is not at a valid level (OFF).

Lastly, as shown in FIG. 1A, at 130, upon connecting a pull-down resistor on the output of a powered-off circuit element, at 132, that node gets pulled down to logic Weak0, which will result in an 'X' with conventional modelling methods, while the actual electrical circuit behavior will result in a Weak0. Presently, there is no way, in event driven simulation, to correctly simulate a condition where a resister (pull-up or pull-down) is coupled to an output of a powered-off circuit element.

In view of this unresolved problem, the disclosed embodiments introduce and define a "weak" undriven state as a signal state, distinguishable from a conventional unknown state, and methods of discerning this "weak" undriven state in circuit modelling and digital/mixed-signal simulations for comprehensive and complete RTL-level design verification.

In accordance with the disclosed embodiments, the unknown state refers to a circuit element that is powered but has an unknown or undeterminable output value, or a circuit element that is undriven and thus left floating. The "weak" undriven state refers to a circuit element that is not powered and has an unknown output value. The "weak" undriven state distinction is particularly useful to model and verify circuit designs known to be resilient to "weak" undriven states, using event driven logic circuit simulators, and avoiding the need for electrical (SPICE) simulators in simulation of digital circuits solely for the purposes of discerning the electrical behaviors associated with the "weak" undriven state. The new, "weak" undriven state enables digital circuit simulators to verify designs that include circuits having "weak" undriven states. Note that a circuit element that is not powered, but has a known input value, will still have an unknown output value, because the input value will not propagate to the output of the powered off circuit element.

In one aspect, a proposed example solution and key components are described as follows. A "weak" undriven state is defined as being different from an unknown state. The undriven unknown state is equivalent to a specific combination of conventional Z (high impedance) and X, where an undriven output is considered Z (having high impedance to both supply and ground side), but evaluates to X for logical operations, and no additional abstraction other than existing Z and X is needed.

In this example, because Z is insufficient in the "weak" undriven state, the "weak" undriven state introduces a new notation, WX. WX can be understood only with the notion of proper power supply and ground, and within traditional low power/power aware, and device level simulation contexts. The "weak" undriven state has, electrically, a high impedance to known supply or ground, when no other circuit element as driver is active, has a transient capacitive coupling of supply/ground possible during power-up, where small glitches (e.g., small, short, transient behaviors) within logic threshold limits is possible when the supply is not fully powered up. Lastly, in the "weak" undriven state, there can be other circuit elements as unexpected drivers and cross-talk, but these are not expected to cause a logic level change.

In another aspect, the following properties exist concerning a handling of the "weak" undriven state (WX) in circuit simulation. The "weak" undriven state (WX) has an associated electrical state, E(WX), which has a high impedance to ground or supply, and no low resistive path to supply or ground. The "weak" undriven state also has an associated Boolean state, B(WX), where WX is interpreted in a receiving circuit element consistent with the supply level of its associated power/voltage domain. Lastly, when handling the "weak" undriven state (WX) in circuit simulation, conventional procedures for handling signal crossing across power/voltage domains continue to apply.

In circuit simulation, the "weak" undriven state has properties as follows:

Logical (Strong and/or Weak 0 or 1):

- 0 AND WX=0; 1 AND WX=B(WX); 0 OR WX=B(WX); 1 OR WX=1;
- NOT WX=NOT B(WX)

Logical (Other):

- Z AND WX=X AND B(WX); Z OR WX=X OR B(WX); X AND WX=X AND B(WX); X OR WX=X OR B(WX)

Multiple Driver Resolution (for 2 Drivers):

- Weak0.Weak1=B(WX); 0.WX=0; 1.WX=1; WX.Z=B(WX);
- Weak0.WX=Weak0; Weak1.WX=Weak1

Lastly, continued conservative modelling in a presence of unknowns is implemented:

- Resistor pull-down (PD), if modelled as Weak0 when connected to active ground, on a net with WX results in 0 (equivalent to a logical wired AND; i.e., Weak0.WX); and
- Resistor pull-up (PU), if modelled as Weak1 when connected to active supply, on a net with WX results in 1 (equivalent to a logical wired OR; i.e., Weak1.WX).

As an example, and explanation, of the above, for circuit elements that are powered-up (for both strong and weak drive strengths): a circuit element having inputs of 0 and WX, with logical gate operation AND, will result in an output state of 0. A circuit element having inputs of 1 and WX, with logical gate operation AND, will result in an output state of B(WX). A circuit element having inputs of 0 and WX, with logical gate operation OR, will result in an output state of B(WX). A circuit element having inputs of 1 and WX, with logical gate operation OR, will result in an output state of 1. A circuit element having input WX, with logical gate operation NOT, will result in an output state of NOT B(WX). Note that in this Logical (strong and/or weak 0 or 1) example, weak does not mean the driving circuit element is powered-off. Only WX means the driver circuit element is powered-off. A weak logic state results from a driving circuit element that is powered-on, but with a weak drive strength.

For other scenarios (e.g., where the output signal is not being driven or in an unknown or high impedance state), a circuit element having inputs of Z and WX, with logical gate operation AND, will result in an output state equivalent to that of X AND B(WX). A circuit element having inputs of Z and X, with logical gate operation OR, will result in an output state equivalent to that of X OR B(WX). A circuit element having inputs of X and WX, with logical gate operation AND, will result in an output state equivalent to that of X AND B(WX). A circuit element having inputs of X and WX, with logical gate operation OR, will result in an output state equivalent to that of X OR B(WX).

Multiple driver resolution describes a situation where two (2) circuit elements are in parallel (i.e., a common node is driven by the outputs of both circuit elements as drivers), where, for example, the second circuit element includes a resistor, and determination of an effective resultant output is to be made. Therefore, resolution here indicates the effective resultant logic state on the net connected to an output of more than one logic circuit. For notation purposes, a dot "." is used to indicate this operation. The above is described for two (2) drivers. However, it is understood that the articulated results are scalable for three (3) or more drivers (i.e., for n drivers).

For the multiple driver resolution (i.e., two (2) circuit elements), above, the first example describes a scenario where the first circuit element has an output value Weak0, the second circuit element has an output value Weak1. Here, the effective resultant output value is B(WX). In the second example, where the first circuit element has an output value 0, the second circuit element has an output value WX, the effective resultant output value is a 0. In the third example, where the first circuit element has an output value 1, the second circuit element has an output value WX, the effective resultant output value is a 1. In the fourth example, where the first circuit element has an output value WX, the second circuit element has an output value Z, the effective resultant output value is B(WX). In the fifth example, where the first circuit element has an output value Weak0, the second circuit element has an output value WX, the effective resultant output value is a Weak0. In the sixth example, where the first circuit element has an output value Weak1, the second circuit element has an output value WX, the effective resultant output value is a Weak1.

For the modelling expressions, where resistors are present, the first example describes a resistor pull-down (PD) in a second circuit element, or between first and second circuit elements, where an output value of the first circuit element is represented with an WX, and a Weak0 value at the resistor, results in an effective resultant logic state of 0 (thereby being equivalent to a logical wired AND). Further, a resistor pull-up (PU) in a second circuit element, or between first and second circuit elements, where an output value of the first circuit element is represented with an WX, and a Weak1 value at the resistor, results in an effective resultant logic state of 1 (thereby being equivalent to a logical wired OR).

In an alternative example, the new notation, WX, can be substituted by Z0 and Z1, where Z0 and Z1 represent partial high impedance to supply (1) and ground (0) respectively, having a potential logic value of 0 (B(WX|Z0)) and 1 (B(WX|Z1)), respectively. This means Z0 and Z1 have high impedance to 1 and 0, respectively. A further alternative representation is also possible, with exact reversal of interpretation: Z0 and Z1, representing high impedance to 0 and 1 respectively, having a potential logic value of 1 (B(WX|Z0)) and 0 (B(WX|Z1)), respectively. High impedance to supply (1) or ground (0) is the state of a digital signal line that is not being actively driven to either a 1 or a 0 respectively. In this situation, another circuit element (e.g., output of another logic gate, or a resistor, or an active clamping circuit connected to supply or ground) could control the logic level of the output signal.

In still another aspect, when modelling circuits that are resilient to weak undriven states, as opposed to a conventional unknown state, the disclosed embodiments provide that all Complementary Metal Oxide Semiconductor (CMOS) logic style circuit elements, under power-off condition, can be modelled as WX. Also, circuits that are resilient to weak undriven states can be modelled, as inputs can model functionality based on the new Boolean properties defined above. Further, pull-up and pull-down circuits can be modelled as high or low impedance circuit elements, and can interact logically based on the new logic behavior that is inherently consistent with correct electrical behavior.

Characteristics of using these strategies in digital circuit simulators, to verify designs using such circuits include: that the disclosed examples naturally scale from Boolean to more accurately abstracted electrical simulations (e.g., identified electrical behavior can be simulated in a Boolean form/abstraction). Also, that a script-based solution prototype is built and used for low power simulation purposes. Further, verification can be based on commercial low power logic circuit simulator Cadence® Xcelium™, using CPF or UPF power intent format. Still further, the disclosed strategies differentiate the special property of WX notation, based on corruption of logic states, due to an absence of power supply to the driving circuit element.

Figure 1B:
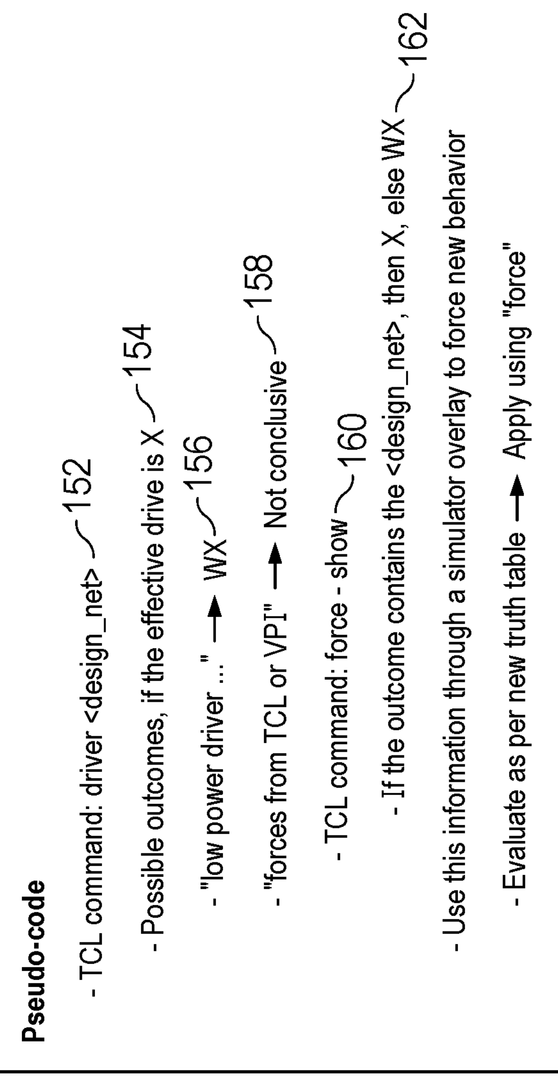
FIG. 1B illustrates an example pseudocode implementation of a simulation overlay method for modelling during behavioral event driven simulation using a Cadence® Xcelium™ simulator.

FIG. 1B illustrates an example pseudocode implementation 150 of a simulation overlay method to handle the proposed modelling method during behavioral event driven simulation using a Cadence® Xcelium™ simulator. In this example, at 152, a Tool Command Language (TCL) based prototype is built, in the Cadence® Xcelium™ circuit simulator environment. In the given environment, execution of the TCL command "driver <design_net>", at 152, has possible outcomes, at 154, if the effective drive is X. Of the possible outcomes, execution of the TCI command will return one of the following outcomes: either "low power driver . . . " 156, or "forces from TCL or Verilog Procedural Interface (VPI)" 158.

If the outcome is "low power driver . . . " 156, it can be concluded that the state of the <design_net> is WX. If the outcome is "forces from TCL or VPI", 158, the interpretation can be inconclusive. Hence, to get further detailed information, an additional TCL command "force-show" 160 will return a list of strings containing driver information for each driving net.

At 162, if, upon parsing the outcome, an entry with <design_net> is found, then the conclusion is that the state of <design_net> is X. If, upon parsing the aforementioned outcome, if there is no entry with <design_net> found, then the conclusion is that the state of <design_net> is WX. Based on aforementioned algorithm, a clear distinction between WX and X states are made and the earlier undefined state of WX in conventional simulators is identified.

A truth table is defined for the weak undriven state (WX), and a conventional logic truth table is defined and/or updated to expand for additional differentiating behaviors of the new weak undriven (WX) state based on the properties detailed above. Once the state of each <design_net> is identified to distinguish between X and WX states, then each receiving circuit element or logic operation is re-evaluated based on the new truth table and the resultant state is applied on the output of the respective circuit element using TCL command "force <state>". This operation is performed iteratively for only those circuit elements whose inputs are different from the state resulting from an evaluation based on the conventional logic truth table.

Figure 2:
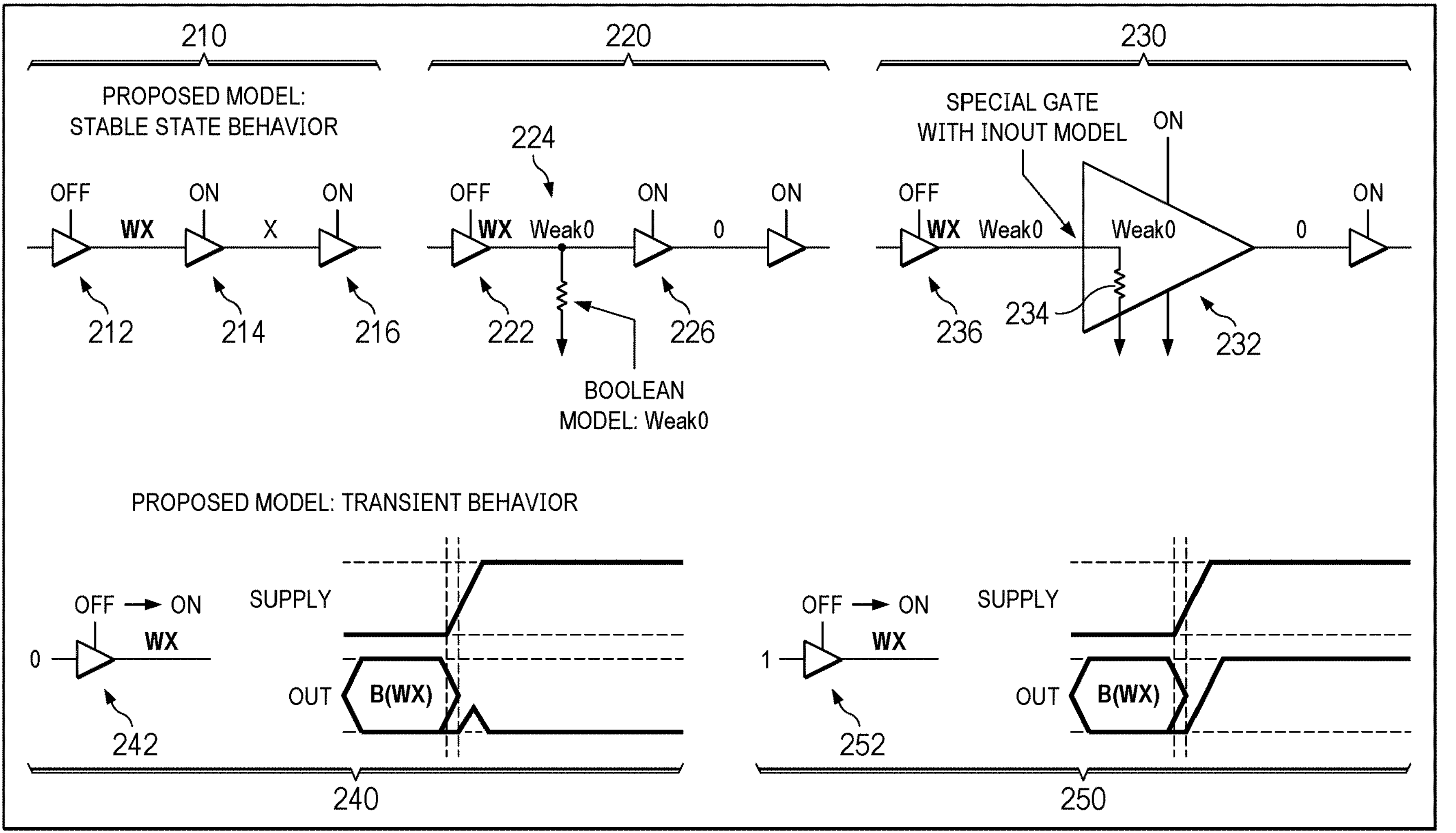
FIG. 2 illustrates proposed models of the disclosed embodiments, both stable state and transient state behaviors.

FIG. 2 illustrates the strength of a proposed method of the described examples, in resolving the limitations earlier highlighted with a conventional modelling method. FIG. 2 shows a proposed model of the disclosed embodiments, both stable state behavior and transient behavior. For simplicity, a logic buffer, that just transfers the state at the input to the output if powered ON, is used as the only type of circuit element illustrated in FIG. 2.

As shown in FIG. 2, at 210, where three circuit elements connected in cascade are in different power states, the first one 212 being powered OFF and the other two 214, 216 powered ON. Notation WX (weak 'X') is introduced to represent the output of the unpowered, undriven state of the first circuit element 212. Properties of WX are defined, where WX is then shown to propagate through a second, ON circuit element 214, where the unknown, after the second, ON circuit element 214, is a conventional undriven state X representing a statistical 0 or 1 state, or an undefined or mid-rail condition.

As shown in FIG. 2, at 220, the first circuit element 222 is again shown as powered OFF, where the proposed model assigns WX (a weak 'X'). The first circuit element 222 output is coupled with a pull-down resistor 224, with Boolean model Weak0, which together with a first circuit element 222, is characterized as resulting in a Weak0 (not as resulting in an unpowered, unknown 'X', as shown in 130). This further propagates as a logic 0 state at the output of third circuit element 226 which is powered ON.

As shown in FIG. 2, at 230, where the second circuit element 232 internally includes a pull-down resistor 234, the proposed model characterizes the pull-down resistor 234 with Boolean model Weak0. The WX output value from the first circuit element 236, coupled with the second circuit element 232, having a Weak0, is characterized as resulting in a Weak0 (again, not as resulting in an unpowered, unknown 'X', as shown in 130). Similarly, at 220 and 230, had the resistor been a pull-up resistor, the output would have resulted in a Weak1. These stable state behaviors, at 210, 220, 230, is an example stable state model.

Regarding transient behaviors: that is, when power supply is going from ON to OFF state, or from OFF to ON state, FIG. 2, at 240, illustrates an OFF to ON state with input drive value 0, for a circuit element 242, that has supply side isolation when powering OFF (i.e., a ground referred circuit operation). Here, the power supply begins at 0 and ramps up to a voltage level required to power the circuit element for normal operation. When the voltage is ramping up, beginning at 0, the output is characterized as B(WX) (Boolean state of Weak 'X'). There may be a small glitch (e.g., small, short, transient behaviors) that may only ramp up to a small percentage of the entire logic voltage range, before settling back to 0 (i.e., settle back to the input drive value; here, shown as 0). Similarly, in one variant, if this was an OFF to ON state with input drive value 1, for a circuit element having ground side isolation when powering OFF (i.e., a supply referred circuit operation), there may be a small glitch that may begin at the full voltage level, ramp down a small percentage of the entire voltage, before settling back to 1.

As shown in FIG. 2, at 250, another transient behavior is illustrated. Here, an OFF to ON state is shown for a circuit element 252, where the input drive value is 1 with a ground referred circuit operation. When the voltage is ramping up, beginning at 0, the output is characterized as B(WX) (Boolean state of Weak 'X'). In this instance, the power supply begins at 0 and ramps up to a voltage level required to power the circuit element for normal operation. Similarly, in one variant, if this was an OFF to ON state with input drive value 0, for a circuit element having ground side isolation when powering it OFF (i.e., a supply referred circuit operation), the power supply would begin at full voltage level and ramp down to 0. The above-described behaviors are the fundamental properties of WX.

Figure 3:
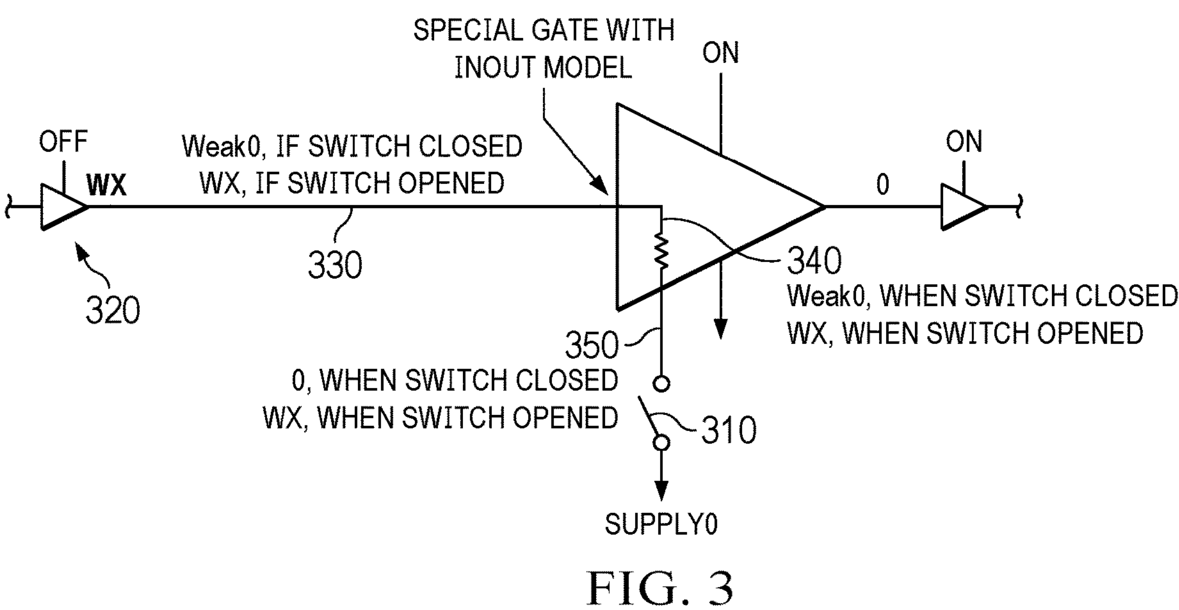
FIG. 3 illustrates a further proposed model of the described examples, showing a resulting modelling of embodiment 230 when an additional switch is added, both when the switch is open and when closed.

FIG. 3 illustrates further proposed modelling of the described examples, primarily showing a further example of embodiment 230, noting an additional switch 310 in series with the pull-down resistor, and illustrating resulting values with the switch 310 open and closed. Initially, with switch 310 closed, ground at 0, and buffer 320 OFF, the results are the same as embodiment 230. That is, with the switch 310 closed, node 350 results in a 0; node 340 results in a Weak0; and node 330 results in a Weak0. Under the same conditions, with switch 310 open, node 350 results in WX; node 340 results in a WX; and node 330 results in a WX.

Figure 4:
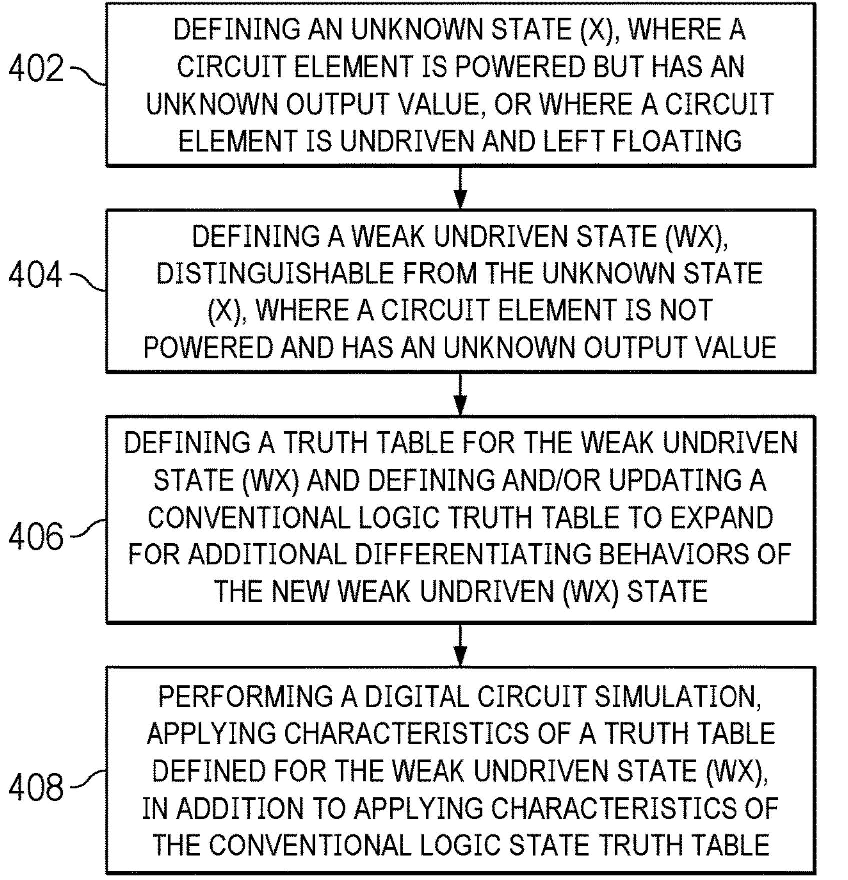
FIG. 4 is a flow chart illustrating example method steps, according to one or more disclosed implementations.

In accordance with the described examples, FIG. 4 illustrates a flow diagram showing example method steps of simulating operation of a circuit comprising a plurality of CMOS logic style circuit elements, according to one or more disclosed implementations. At step 402, an unknown state (X) is defined, which is where a circuit element is powered but has an unknown output value, or where a circuit element is undriven and left floating. At step 404, a weak undriven state (WX) is defined, the weak undriven state (WX) being distinguishable from the unknown state (X), the weak undriven state (X) being where a circuit element is not powered and has an unknown output value. At step 406, a truth table is defined for the weak undriven state (WX), and a conventional logic truth table is defined and/or updated to expand for additional differentiating behaviors of the new weak undriven (WX) state. At step 408, a digital circuit simulation is performed, applying the characteristics of the truth table defined for the weak undriven state (WX), in addition to applying the characteristics of the conventional logic state truth table.

Figure 5:
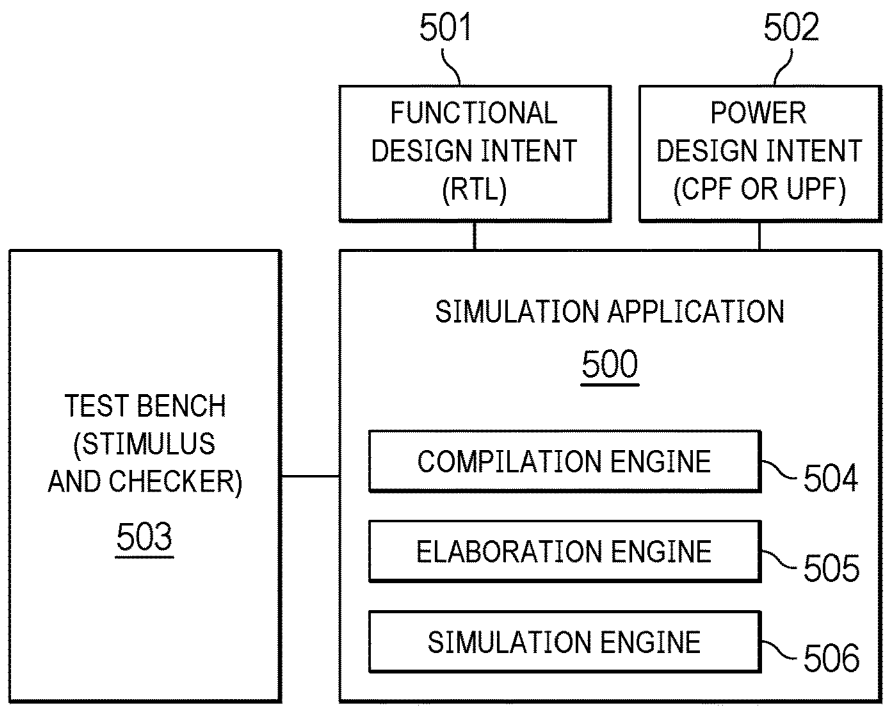
FIG. 5 is a block diagram of a simulation application for a registered transfer level (RTL) of design, according to one or more disclosed implementations.

FIG. 5 illustrates a simulation application or program 500 that accesses a system functional design intent file 501 (e.g., in Verilog hardware description language (HDL) format); a system power design intent file 502 (e.g., in common power format (CPF) or unified power format (UPF)); and a testbench file 503 (e.g., in System Verilog hardware description language (HDL) format containing input stimulus, output checkers and signature analyzers) in a file compilation block. In one part, the file compilation block, executed by a compilation engine 504, accesses the external files 501, 502, 503 to identify any syntax errors that would prevent a successful simulation implementation. Elaboration is performed by the simulation application 500, using an elaboration engine 505, to create a simulation database linking the components of the system-on-chip (SoC), as defined in the simulation configuration files (e.g., the functional design intent file 501, the power design intent file 502, the testbench file 503, etc.). The simulation object thus created is run or executed by a simulation engine 506, of the simulation application 500, to simulate operation of the SoC design.

While SoC design is one example application, the simulation application can be applied for any digital design (including an SoC design).

Figure 6:
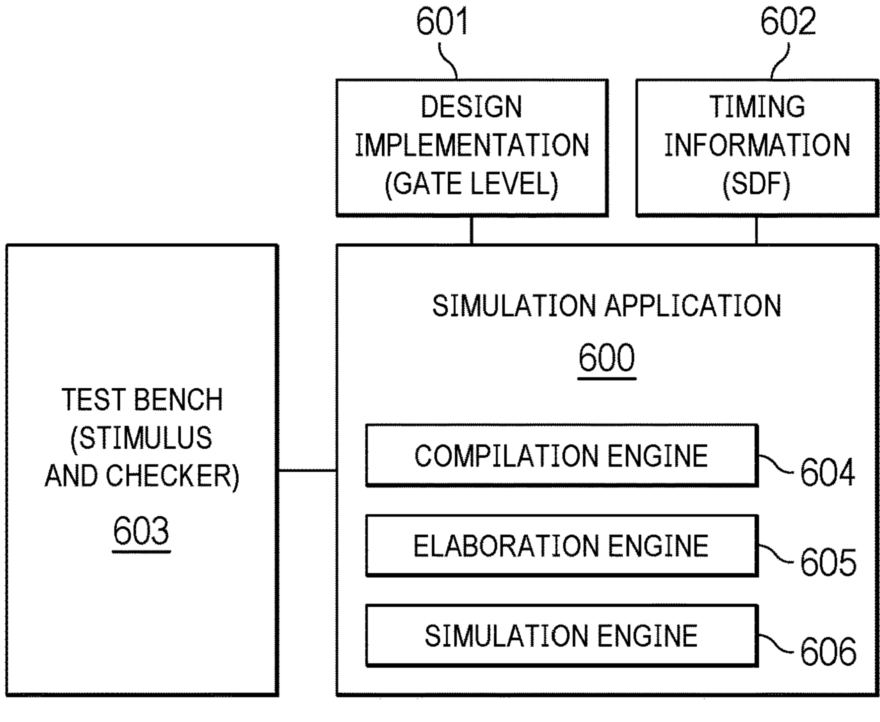
FIG. 6 is a block diagram of a simulation application for a gate level (GL) stage of design, according to one or more disclosed implementations.

FIG. 6 illustrates a simulation application or program 600, that accesses a system functional design implementation file 601 (e.g., in Verilog hardware description language (HDL) format); a system timing information file 602 (e.g., in standard delay format (SDF)); and a testbench file 603 (e.g., in System Verilog hardware description language (HDL) format containing input stimulus, output checkers and signature analyzers) in a file compilation block. In one part, the file compilation block, executed by a compilation engine 604, accesses the external files 601, 602 603 to identify any syntax errors that would prevent a successful simulation implementation. Elaboration is performed by the simulation application 600, using an elaboration engine 605, to create a simulation linking the components of the SoC, as defined in the simulation configuration files (e.g., the functional design intent file 601, the power design intent file 602, the testbench file 603, etc.). The simulation object thus created is run or executed by a simulation engine 506, of the simulation application 600, to simulate operation of the SoC design. Again, while SoC design is one example application, the simulation application can be applied for any digital design (including an SoC design).

A performance status of the SoC may be determined based on the executed simulation. The SoC designer or other personnel may compare output of the simulation based on how the behavior and functionality were designed to work and determine whether the simulation represented operation of the SoC as expected or such a comparison may be automated as part of the testbench. If the performance status indicates a failure, one or more of the simulation configuration files may be modified in response. If the performance status indicates a pass or other satisfactory result, the SoC design may be manufactured to produce the designed SoC in physical form.

Figure 7:
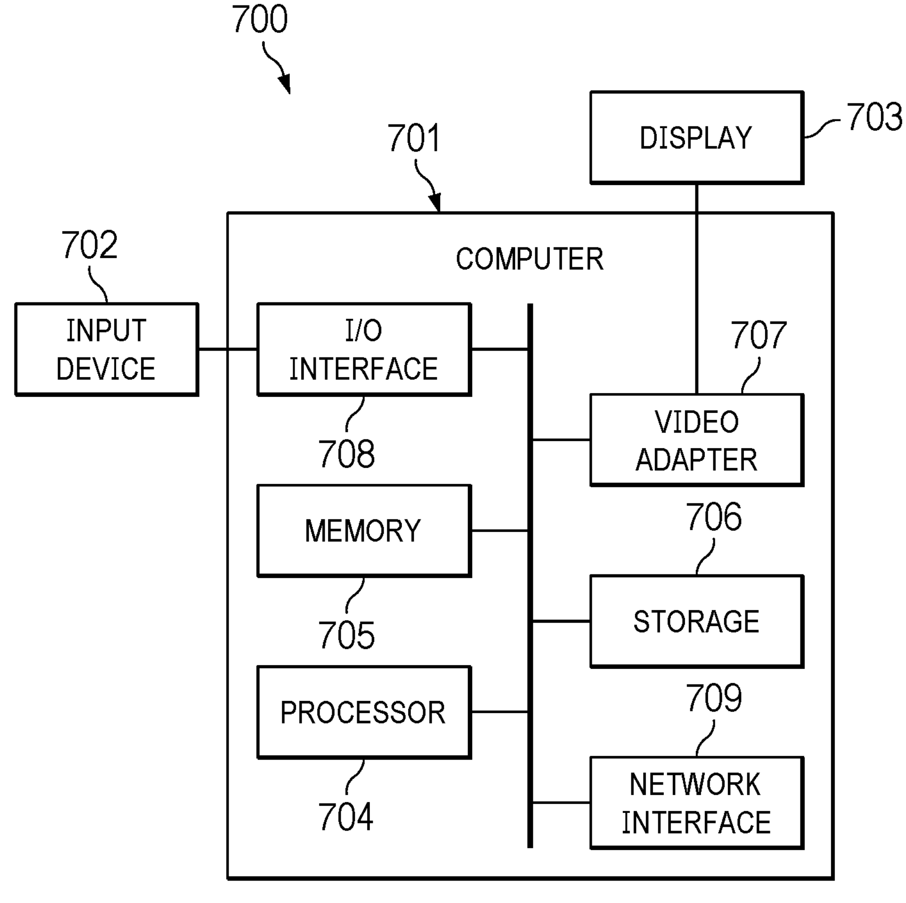
FIG. 7 is a block diagram of an example computer system that may be used to perform system-on-chip (SoC) simulation, according to one or more disclosed implementations.

FIG. 7 is a block diagram of an example computer system 700 that may be used to perform chip design simulation as described herein. The computer system 700 includes a processing unit 701, coupled to one or more input devices 702 (e.g., a mouse, a keyboard, or the like), and one or more output devices, such as a display screen 703. The display screen 703 may be used to display progress of the simulation described herein to allow a user to monitor operational performance of the simulation. In some embodiments, the display screen 703 may be touch screen, thus allowing the display screen 703 to also function as an input device. The processing unit 701 may be, for example, a desktop computer, a workstation, a laptop computer, a tablet, a dedicated unit customized for a particular application, a server, or the like. The display screen 703 may be any suitable visual display unit such as, for example, a computer monitor, an LED, LCD, or plasma display, a television, a high-definition television, or a combination thereof. The display screen 703 can be used, for example, to perform and display the simulation and display the performance status of the simulation, such as that described herein.

The processing unit 701 includes a processor 704, memory 705, a storage device 706, a video adapter 707, and an I/O interface 708 connected by a bus. The bus may be one or more of any type of several bus architectures including a memory bus or memory controller, a peripheral bus, video bus, or the like. The processor 704 may be any type of electronic data processor. For example, the processor 704 may be a processor from Intel Corp., a processor from Advanced Micro Devices, Inc., a Reduced Instruction Set Computer (RISC), an Application-Specific Integrated Circuit (ASIC), or the like.

The memory 705 (e.g., a non-transitory computer-readable medium), can be any type of system memory such as static random-access memory (SRAM), dynamic random-access memory (DRAM), synchronous DRAM (SDRAM), read-only memory (ROM), a combination thereof, or the like. Further, the memory 705 can include ROM for use at boot-up, and DRAM for data storage for use while executing programs.

The storage device 706 (e.g., a non-transitory computer-readable medium), can include any type of storage device configured to store data, programs, and other information and to make the data, programs, and other information accessible via the bus. In one or more embodiments, the storage device 706 stores software instructions to be executed by the processor 704 to perform embodiments of the methods described herein. The storage device 706 may be, for example, one or more of a hard disk drive, a magnetic disk drive, an optical disk drive, a solid-state drive, or the like.

The video adapter 707 and the I/O interface 708 provide interfaces to couple external input and output devices to the processing unit 701. The processing unit 701 also includes a network interface 709. The network interface 709 allows the processing unit 701 to communicate with remote units via a network (not shown). The network interface 709 may provide an interface for a wired link, such as an Ethernet cable or the like, or a wireless link. The computer system 700 may also include other components not specifically shown. For example, the computer system 700 may include power supplies, cables, a motherboard, removable storage media, cases, and the like.

While an SoC is primarily used throughout the above disclosure as an example type of chip, it will be appreciated that the techniques described herein may be applied in designing any type of integrated circuit (IC) chip. For instance, such IC chips may include a general-purpose or application specific (ASIC) processor based upon x86, RISC, or other architectures, field-programmable gate array (FPGA), graphics processor (GPU), digital signal processor (DSP), a system-on-chip (SoC) processor, microcontroller, and/or related chip sets. By way of example only, the IC chip may be a model of a digital signal processor, an embedded processor, an SoC, or a microcontroller available from Texas Instruments Inc. of Dallas, Tex.

While aspects of the disclosure have been described with reference to illustrative examples, this description is not intended to be construed in a limiting sense. Various other aspects and examples will be apparent to persons skilled in the art upon reference to this description.

Although method steps may be presented and described herein in a sequential fashion, one or more of the steps shown and described may be omitted, repeated, performed concurrently, and/or performed in a different order than the order shown in the figures and/or described herein. Accordingly, aspects described should not be considered limited to the specific ordering of steps shown in the figures and/or described herein.

It is therefore contemplated that the appended claims be interpreted to embrace all such variations and modifications of the aspects described.

What is claimed is:

1. A method of simulating operation of a circuit comprising a plurality of CMOS logic style circuit elements, the method comprising the steps of:

defining an unknown state, where a circuit element is powered but has an unknown output value, or where a circuit element is undriven and left floating;

defining a weak undriven state, distinguishable from the unknown state, where a circuit element is not powered and has an unknown output value; and performing a digital circuit simulation including:

simulating a first circuit element in the weak undriven state, the first circuit element having an output;

simulating a second circuit element having an output coupled to the output of the first circuit element at a common node; and determining an output value at the common node based on the weak undriven state of the first circuit element, a state of the second circuit element, and a truth table defined for the weak undriven state.

2. The method of claim 1, where, in the unknown state, the unknown output value can be a statistical 0 or 1 state, or any other sustained, stable state at mid-rail voltage level.

3. The method of claim 1, where, in the weak undriven state, where supply voltage is less than a minimum level, Vmin, and remains less than Vmin over a simulation operation, the unknown output value is not determinable.

4. The method of claim 1, wherein the unknown state:

is equivalent to a combination of conventional Z (high impedance) and X;

where driven output is considered X;

where undriven output is considered Z, having high impedance to both supply and ground side, but evaluates to X for logical operations; and no additional abstraction other than existing Z and X is needed.

5. The method of claim 1, wherein the weak undriven state:

has, electrically, a high impedance to a supply or ground, when no other driving circuit element is active; and has a transient capacitive coupling of the supply or ground during power-up, where small, short transient behaviors within logic threshold limits are possible when the supply is not fully powered-up.

6. The method of claim 5, wherein, in circuit simulation, the weak undriven state has:

an electrical state, E(WX), having a high impedance to the supply or ground, and a resistive path to the supply or ground; and a Boolean state, B(WX), where WX is interpreted in receiving power/voltage domain;

wherein, the truth table for the weak undriven state includes, for:

Logical (strong and weak): 0 AND WX=0; 1 AND WX=B(WX); 0 OR WX=B(WX); 1 OR WX=1; NOT WX=NOT B(WX);

Logical (other): Z AND WX=X AND B(WX); Z OR WX=X OR B(WX); X AND WX=X AND B(WX); X OR WX=X OR B(WX); and Multiple driver resolution (for 2 drivers): Weak0.Weak1=B(WX); 0.WX=0; 1.WX=1; WX.Z=B(WX); Weak0.WX=Weak0; Weak1.WX=Weak1.

7. The method of claim 6, wherein, in circuit simulation, in the weak undriven state:

resistor pull-down (PD), if modelled as Weak0 when connected to active ground, on a net with WX results in 0; and resistor pull-up (PU), if modelled as Weak1 when connected to active supply, on a net with WX results in 1.

8. The method of claim 1, wherein the weak undriven state:

introduces notation Z0 and Z1, where Z0 and Z1 represents partial high impedance to 1 and 0, having a potential logic value of 0 and 1, respectively; or introduces notation Z0 and Z1, where Z0 and Z1 represents partial high impedance to 0 and 1, having a potential logic value of 1 and 0, respectively.

9. The method of claim 1, wherein the weak undriven state has an electrically high impedance to supply or ground when no other driving circuit element is active.

10. A non-transitory computer-readable medium storing instructions that, when executed by a processor, cause the processor to:

define an unknown state, where a circuit element is powered but has an unknown output value, or where a circuit element is undriven and left floating;

define a weak undriven state, distinguishable from the unknown state, where a circuit element is not powered and has an unknown output value; and perform a digital circuit simulation including:

simulating a first circuit element in the weak undriven state, the first circuit element having an output;

simulating a second circuit element having an output coupled to the output of the first circuit element at a common node; and determining an output value at the common node based on the weak undriven state of the first circuit element, a state of the second circuit element, and a truth table defined for the weak undriven state.

11. The non-transitory computer-readable medium of claim 10, where:

in the unknown state, the unknown output value can be a statistical 0 or 1 state, or any other sustained, stable state at mid-rail voltage level; and in the weak undriven state, where supply voltage is less than a minimum level, Vmin, and remains less than Vmin over a simulation operation, the unknown output value is not determinable.

12. The non-transitory computer-readable medium of claim 10, wherein the unknown state:

is equivalent to a combination of conventional Z (high impedance) and X;

where driven output is considered X;

where undriven output is considered Z, having high impedance to both supply and ground side, but evaluates to X for logical operations; and no additional abstraction other than existing Z and X is needed.

13. The non-transitory computer-readable medium of claim 10, wherein the weak undriven state:

has, electrically, a high impedance to known supply or ground, when no other driving circuit element is active; and has a transient capacitive coupling of supply/ground possible during power-up, where small, short transient behaviors within logic threshold limits is possible when supply is not fully powered-up.

14. The non-transitory computer-readable medium of claim 13, wherein, in circuit simulation, the weak undriven state has:

an electrical state, E(WX), having a high impedance to ground/supply, and a resistive path to supply/ground; and a Boolean state, B(WX), where WX is interpreted in receiving power/voltage domain;

wherein, the truth table for the weak undriven state includes, for:

Logical (strong and weak): 0 AND WX=0; 1 AND WX=B(WX); 0 OR WX=B(WX); 1 OR WX=1; NOT WX=NOT B(WX);

Logical (other): Z AND WX=X AND B(WX); Z OR WX=X OR B(WX); X AND WX=X AND B(WX); X OR WX=X OR B(WX);

Multiple driver resolution (for 2 drivers): Weak0.Weak1=B(WX); 0.WX=0; 1.WX=1; WX.Z=B(WX); Weak0.WX=Weak0; Weak1.WX=Weak1;

Resistor pull-down (PD), if modelled as Weak0 when connected to active ground, on a net with WX results in 0 (equivalent to a logical wired AND; i.e., Weak0.WX); and Resistor pull-up (PU), if modelled as Weak1 when connected to active supply, on a net with WX results in 1 (equivalent to a logical wired OR; i.e., Weak1.WX).

15. The non-transitory computer-readable medium of claim 10, wherein the weak undriven state:

introduces notation Z0 and Z1, where Z0 and Z1 represents partial high impedance to 1 and 0, having a potential logic value of 0 and 1, respectively; or introduces notation Z0 and Z1, where Z0 and Z1 represents partial high impedance to 0 and 1, having a potential logic values of 1 and 0, respectively.

16. A digital circuit verification system, comprising:

a hardware processing unit; and a non-transitory computer-readable storage medium storing instructions that, when executed by the hardware processing unit, cause the digital circuit verification system to:

define an unknown state, where a circuit element is powered but has an unknown output value, or where a circuit element is undriven and left floating;

define a weak undriven state, distinguishable from the unknown state, where a circuit element is not powered and has an unknown output value; and perform a digital circuit simulation including:

simulating a first circuit element in the weak undriven state, the first circuit element having an output;

simulating a second circuit element having an output coupled to the output of the first circuit element at a common node; and determining an output value at the common node based on the weak undriven state of the first circuit element, a state of the second circuit element, and a truth table defined for the weak undriven state.

17. The digital circuit verification system of claim 16, wherein the unknown state:

is equivalent to a combination of conventional Z (high impedance) and X;

where driven output is considered X;

where undriven output is considered Z, having high impedance to both supply and ground side, but evaluates to X for logical operations; and no additional abstraction other than existing Z and X is needed.

18. The digital circuit verification system of claim 16, wherein the weak undriven state:

has, electrically, a high impedance to known supply or ground, when no other driving circuit element is active; and has a transient capacitive coupling of supply/ground possible during power-up, where small, short transient behaviors within logic threshold limits is possible when supply is not fully powered-up.

19. The digital circuit verification system of claim 18, wherein, in circuit simulation, the weak undriven state has:

an electrical state, E(WX), having a high impedance to ground/supply, and a resistive path to supply/ground; and a Boolean state, B(WX), where WX is interpreted in receiving power/voltage domain;

wherein, the truth table for the weak undriven state includes, for:

Logical (strong and weak): 0 AND WX=0; 1 AND WX=B(WX); 0 OR WX=B(WX); 1 OR WX=1; NOT WX=NOT B(WX);

Logical (other): Z AND WX=X AND B(WX); Z OR WX=X OR B(WX); X AND WX=X AND B(WX); X OR WX=X OR B(WX);

Multiple driver resolution (for 2 drivers): Weak0.Weak1=B(WX); 0.WX=0; 1.WX=1; WX.Z=B(WX); Weak0.WX=Weak0; Weak1.WX=Weak1;

Resistor pull-down (PD), if modelled as Weak0 when connected to active ground, on a net with WX results in 0 (equivalent to a logical wired AND; i.e., Weak0.WX); and Resistor pull-up (PU), if modelled as Weak1 when connected to active supply, on a net with WX results in 1 (equivalent to a logical wired OR; i.e., Weak1.WX).

20. The digital circuit verification system of claim 16, wherein the weak undriven state:

introduces notation Z0 and Z1, where Z0 and Z1 represents partial high impedance to 1 and 0, having a potential logic value of 0 and 1, respectively; or introduces notation Z0 and Z1, where Z0 and Z1 represents partial high impedance to 0 and 1, having a potential logic values of 1 and 0, respectively.

* * * * *